July 31, 1951 W. S. RAMSAY 2,562,477
BONDING AND GLAZING OF CONCRETE ARTICLES
Filed July 16, 1948 2 Sheets—Sheet 1

INVENTOR.
William S. Ramsay
BY
ATTORNEYS

INVENTOR.
William S. Ramsay
BY
ATTORNEYS

Patented July 31, 1951

2,562,477

UNITED STATES PATENT OFFICE 2,562,477

BONDING AND GLAZING OF CONCRETE ARTICLES

William S. Ramsay, Canton, Ohio, assignor, by mesne assignments, to Stark Ceramics, Inc., Canton, Ohio, a corporation of Ohio Application July 16, 1948, Serial No. 39,012

19 Claims. (Cl. 18—47.5)

The invention relates to the bonding and glazing of concrete articles formed of or containing considerable quantities of hydraulic cement.

Vitreous enamels, such as porcelain enamel, fritted glazes and the like, cannot be applied to the surfaces of articles formed from hydraulic cement, owing to the fact that after application of the enamel as by dipping, spraying, dusting or the like, the articles are placed in a furnace or kiln and heated to a temperature which will cause the enamel to fuse and adhere as a continuous surface layer upon the body of the article.

The temperature to which the articles are subjected, in order to fuse the enamel, destroys the hydraulic bond of articles formed of hydraulic cement and also causes the surfaces of the articles to spall so that the enamel will not adhere thereto.

It is therefore an object of the present invention to provide a method of glazing such concrete articles in a manner which developes a glass bond in the article as the hydraulic bond is lost during the heating of the article in the glazing operation.

Another object is to provide a method of forming and glazing hydraulic cement articles in which a small amount of glass cullet, feldspar, frit or similar heat-bonding material is mixed with hydraulic cement and refractory aggregate in the casting or molding of such concrete articles, after which the articles are heated to a temperature sufficient to fuse the bonding material and provide a surface to which vitreous enamel will adhere.

A further object is to provide such a method in which a sufficient amount of the glass cullet or other heat-bonding material may be used in the formation of hydraulic cement articles to produce a vitreous glaze upon the surfaces of the articles.

A still further object is to provide a method of coating an article formed of hydraulic cement with a fused vitreous enamel, which consists in forming a relatively thin layer of hydraulic cement and refractory aggregate and heat bonding material upon the exterior of the cement article, and fusing a coating of vitreous enamel upon the surface of said layer, while maintaining the body of the article at a sufficiently low temperature to prevent damage thereto.

Another object is to provide such a method which consists in first placing a relatively thin layer of cement, refractory aggregate and heat bonding material in one side of a mold, then filling the mold with hydraulic cement and sand and gravel or similar aggregate, curing the cast or molded article, then spraying, dipping, dusting or otherwise applying a coating of vitreous enamel upon the surface of said layer, and subjecting said surface to sufficient temperature to fuse the enamel, while maintaining the body of the article at a temperature at which the strength thereof will not be impaired.

A further object is to provide such a method which consists in first forming a relatively thin slab of hydraulic cement, refractory aggregate and heat bonding material, having tie wires, dove-tail ribs and grooves, or other means upon one surface for attaching it to a concrete article, applying a coating of vitreous enamel to the opposite surface of said slab, and placing the slab in one side of a mold and casting or molding a block or other article of hydraulic cement and aggregate therein with the thin slab bonded thereto.

The invention further contemplates the enamel coating of articles formed entirely of hydraulic cement, refractory aggregate and heat bonding material.

The above objects, together with others which will be apparent from the following description, or which may be later referred to, may be attained by carrying out the method of bonding and glazing concrete articles in the manner hereinafter described in detail, reference being made to the drawings, in which:

Fig. 2 is a similar view showing the remainder of the mold filled with hydraulic cement and aggregate, to cast or mold a block or the like;

Figure 3:
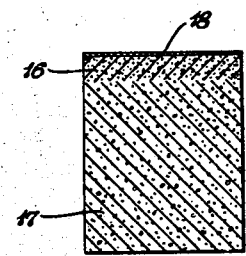
Figure 4:
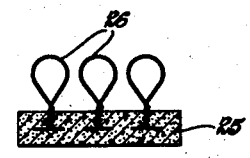
Figure 5:
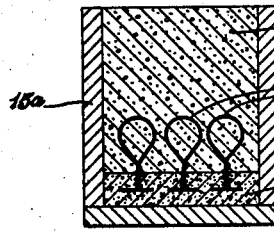
Figure 6:
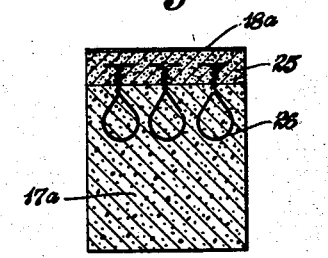
Figure 7:
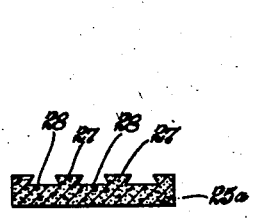
Figure 8:
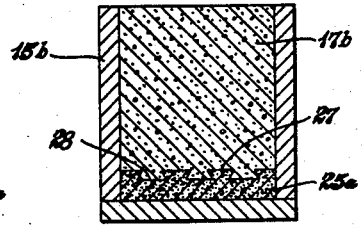
Figure 9:
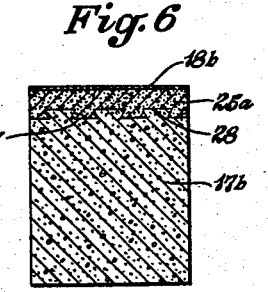
Figure 10:
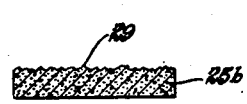
Figure 11:
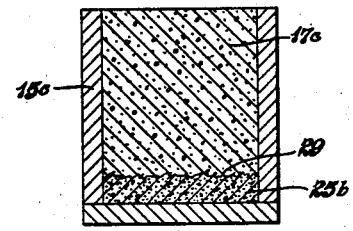
Figure 12:
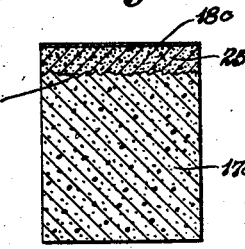
Figure 14:
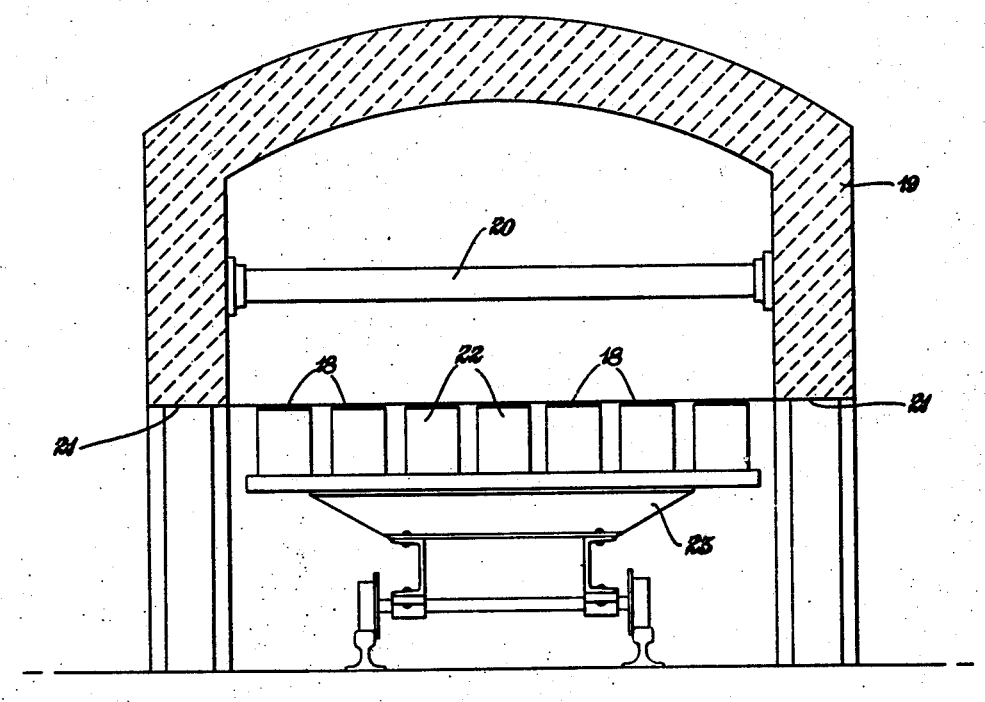
Figure 13:
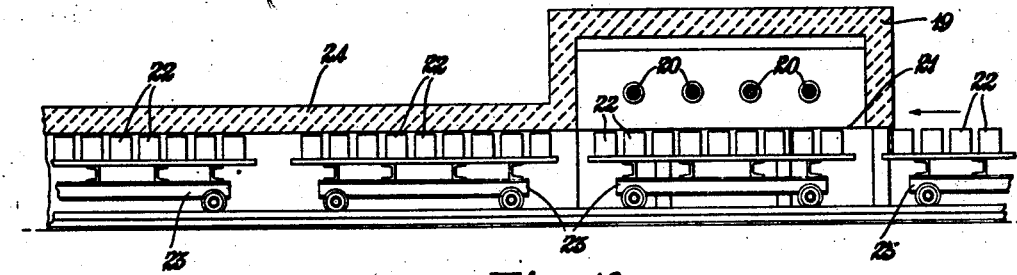

Fig. 3 a vertical sectional view of the composite block formed by this method, showing the same inverted with a coating of porcelain enamel applied to the outer surface of the thin layer;

Fig. 4 is a vertical sectional view through a relatively thin slab of hydraulic cement, refractory aggregate and heat bonding material, with tie wires molded therein;

Fig. 5 a vertical sectional view of a mold with the slab shown in Fig. 4 located in one side of the mold, the remainder of the mold being filled with hydraulic cement and aggregate to form a concrete block to one surface of which the slab is bonded;

Fig. 6 an inverted, sectional view of the composite block thus formed, after curing, with a coating of porcelain enamel applied to the surface of the slab;

Fig. 7 a vertical, sectional view through a slab of hydraulic cement, refractory aggregate and heat bonding material, having dove-tail grooves and ribs in one surface;

Fig. 8 a vertical, sectional view of a mold with the slab of Fig. 7 located in one side thereof, showing the manner of bonding the same to a block of hydraulic cement and aggregate;

Fig. 9 an inverted, vertical section of the block formed in Fig. 8, after the same is cured and with a coating of porcelain enamel applied to the surface of the slab;

Fig. 10 a vertical, sectional view through a slab of hydraulic cement, refractory aggregate and heat bonding material, having one side roughened to form an anchorage;

Fig. 11 a vertical, sectional view through a mold in which the slab shown in Fig. 10 is located in one side of the mold, and a block of hydraulic cement and aggregate bonded to the roughened side thereof;

Fig. 12 an inverted, sectional view of the block formed in Fig. 11, after the same has been cured and a coating of porcelain enamel applied to the heat bonded surface thereof;

Fig. 13 a longitudinal sectional view through a tunnel kiln in which the enamel coating may be fused; and Fig. 14 an enlarged, transverse sectional view through the heating chamber of the furnace shown in Fig. 13.

In carrying out the invention, a hydraulic cement, which may be either Portland cement or calcium aluminate cement, is mixed with a refractory aggregate, such as burned clay or the like, and a relatively small amount of a heat-bonding material, such as glass cullet, feldspar or frit, and sufficient water is added to either cast or mold the articles in conventional manner.

After the articles are sufficiently hardened to be removed from the molds they may be cured in any conventional manner, after which they are placed in a furnace or kiln and heated to the necessary temperature for the required period of time to cause the glass cullet or other heat-bonding material to fuse, developing a glass bond within the article to take the place of the hydraulic bond, which is lost or severely damaged by the high temperature to which the article has been subjected.

This fusing of the heat-bonding material also provides a satisfactory surface upon the article to which any vitreous enamel will adhere. The vitreous enamel may be applied to the surface or surfaces of the article to be coated by dipping, spraying, dusting or the like, before the articles are placed in the furnace or kiln as above described so that the vitreous enamel is fused during the bonding of the article, or this may be done in a separate operation after the article has been bonded as above described by again placing it in a furnace or kiln to glaze the vitreous enamel coating thereon.

In cases where it is not important that the vitreous enamel be of any particular color, a vitreous enamel glaze may be obtained by adding a sufficient amount of glass cullet or other heat-bonding material to the concrete mixture and subjecting the article to a sufficiently high temperature for a sufficient period of time whereby a portion of the heat-bonding material as it fuses will emerge from the body of the article to the surfaces thereof, producing a satisfactory glaze thereon.

In practice the ingredients may be mixed in the proportion of about one part of Portland cement or calcium aluminate cement to three parts of refractory aggregate and about one-fourth of one part of glass cullet, feldspar, frit or other heat-bonding material.

Sufficient water is added to the mixture so that it may be cast or molded in conventional manner and after the concrete article thus formed has been cured it may be fired for about one-half minute at a temperature of about 2100° F. which is sufficient to provide a glass bond throughout the body of the article and to provide outer surfaces to which a vitreous enamel will adhere.

The vitreous enamel may be dipped, sprayed, dusted or otherwise applied to the surfaces to be coated, after the article has been cured, so that the vitreous enamel is fused in the same heating operation in which the heat-bonding material is fused. Or if desired, the concrete article may be fired as above described after which the vitreous enamel coating may be applied thereto and the article again fired to fuse the enamel.

With the proportions of the ingredients given above, and without the application of any enamel coating, the article may be fired for about two minutes at a temperature of about 2100° F. which results in not only providing the glass bond throughout the body of the article but also providing a vitreous enamel coating upon the outer surfaces of the article caused by some of the bonding material emerging onto the surfaces of the article and fusing thereon.

It has also been found that with the proportions of cement and refractory aggregate given, about one-eighth of one part of glass cullet or other heat-bonding material may be added to the mixture and the articles cast or molded as above described, and after curing, the article may be heated to about 2100° F. for a period of about two minutes, providing a satisfactory glass bond throughout the body of the article without producing any glaze upon the exterior thereof. Such articles may be glazed with a vitreous enamel as above described.

Figure 1:
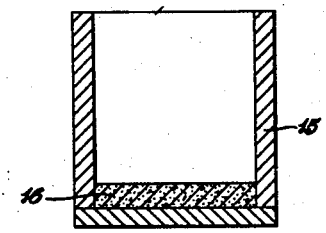
Figure 1 is a vertical sectional view of a mold for forming a concrete block or the like, showing a relatively thin layer of hydraulic cement, refractory aggregate and heat bonding material located in the bottom of the mold.

Referring now to the drawings, in carrying out the invention any conventional mold, such as is ordinarily used in casting or molding concrete articles, is indicated at 15, and as shown in Fig. 1, a thin layer of hydraulic cement, refractory aggregate and heat-bonding material, which may be in the proportions of about one part cement, three parts refractory aggregate and ⅛ to ¼ part of heat-bonding material with sufficient water is first placed in the bottom of the mold, as indicated at 16 in Fig. 1, this layer being relatively thin, and in practice being about one-fourth inch or less.

Figure 2:
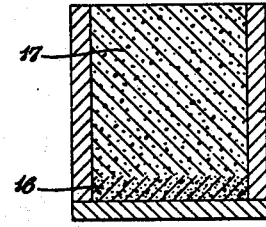

Then, as shown in Fig. 2, the mold is filled with a mixture of hydraulic cement and aggregate, such as sand and gravel or the like, as indicated at 17, which mixture may be in the proportions of about one part of cement to seven parts of aggregate, and sufficient water.

After the composite article thus formed has sufficiently hardened to remove it from the mold, it may be cured in conventional manner, after which a coating of any well known vitreous enamel, such as porcelain enamel or fritted glaze, may be sprayed, dusted or otherwise applied to the surface of the layer 16, as indicated at 18 in Fig. 3.

The enameled surface of the composite block, or other article thus formed, is then fired to fuse the enamel, this firing being carried out by submitting the heat bonded layer 16 only of the article to the extreme temperature required for fusing the enamel, while the body of the article is maintained at a temperature which will not detrimentally effect the mechanical or structural properties thereof.

The burning may be accomplished by submitting the enameled surface of the article to a temperature of about 2100° F. for a period of one-half minute to two minutes, in order to fuse the enamel and the heat bonding material in the layer 16, forming a heat bond in the layer as the hydraulic bond therein is lost, thus providing a suitable surface to which the fused enamel coating will adhere.

In order to carry out the firing of the enameled surfaces of the articles, while maintaining the ordinary concrete bodies of the articles below the temperature at which the mechanical and structural properties thereof will be detrimentally affected, a kiln such as shown in Figs. 13 and 14 may be used, comprising generally a heating chamber 19, which may be provided with suitable heating means, such as the electric resistor elements 20, the bottom of the heating chamber being open, as indicated at 21.

The composite concrete articles, indicated generally at 22 in Figs. 13 and 14, are passed through a kiln upon cars indicated generally at 23, a conveyor or the like, in such position that only the glazed, upper surfaces 18 thereof will be submitted to the extreme temperatures of the heating chamber, while the remainder of each article 22 is located below the open bottom 21 of the heating chamber, as shown in Fig. 13, so that they will not be subjected to the extreme temperatures of the kiln and will remain sufficiently cool so that the ordinary concrete bodies of the articles will not be weakened.

Beyond the heating chamber 19 the articles may pass through a cooling tunnel 24 in which they are slowly cooled down to a temperature at which they may be sufficiently discharged from the kiln.

The composite articles may also be formed by the method shown in Figs. 1 to 4, in which a thin slab 25 of hydraulic cement, refractory aggregate and heat bonding material, such as glass cullet, feldspar or frit, may first be formed as shown in Fig. 4, with tie wires or the like, as indicated at 26, molded therein.

This slab may be cured in any suitable manner and then coated with a vitreous enamel and fired to fuse the enamel coating on the surface, after which the slab 25 may be placed in a mold 15a as shown in Fig. 5, and the mold filled with hydraulic cement and aggregate, as indicated at 17a, the ties 26 forming anchors to bond the heat bonded slab to the concrete body. After the concrete body of the article has been cured, the article is ready for use.

If desired, the slab 25 may be cured and then placed in one side of the mold 15a, as shown in Fig. 5, and the mold is filled with a mixture of hydraulic cement and aggregate, as indicated at 17a, the ties 26 forming anchors to bond the slab to the body of the concrete article.

After the concrete body has sufficiently hardened, the composite article may be removed from the mold and cured in conventional manner, after which a coating 18a of any suitable vitreous enamel is applied thereto and the article may then be fired in the manner above described.

In Figs. 7 to 9, is shown another method in which the article may be formed. A thin slab 25a, of hydraulic cement, refractory aggregate and heat bonding material, is formed as shown in Fig. 7, with alternate dove tail ribs and grooves 27 and 28 in one surface thereof.

This slab may then be cured, glazed and fired as above described, or after curing may be placed in one side of a mold 15b, as shown in Fig. 8, and the mold filled with hydraulic cement and aggregate, as indicated at 17b, the alternate dove tail ribs and grooves providing anchorage between the slab and the body of the concrete article.

After the concrete has sufficiently hardened, the article may be removed from the mold and cured and then a coating 18b of vitreous enamel is applied to the surface of the slab and the article may be fired as above described.

Another method of making the composite block is shown in Figs. 10 to 12, in which a slab 25b of hydraulic cement, refractory aggregate and heat bonding material, as shown in Fig. 10, is formed with one side thereof roughened, as indicated at 29. This thin slab may be cured, glazed and fired, or, after curing may be placed in one side of a mold, as indicated at 15c, and the mold is filled with hydraulic cement and aggregate, as indicated at 17c and after hardening may be removed from the mold and cured, bonding being produced between the slab and the ordinary concrete body by means of the roughened surface 29.

This composite article, after curing, is coated with vitreous enamel, as indicated at 18c and the article may be fired as above described. It should be understood that if desired an entire block or other article, such as the slabs above described, may be formed of hydraulic cement, refractory aggregate and heat bonding material, and cured, enameled and fired as above described.

The method of the present invention produces a finished article characterized by the fact that the fired, surface layer of enamel is securely bonded to the heat bonding surface of the article, which forms a ceramic bond as it loses its hydraulic bond through firing, while the ordinary concrete body of the article is not impaired by the fusing of the enamel.

By the term "refractory" as used herein, in referring to the aggregates used in the improved method, it should be understood that this term is intended to cover not only clays, silica and the like, but any material which is sufficiently refractory to withstand the temperatures to which the materials are necessarily subjected in carrying out the method.

I claim:

1. The method of bonding concrete articles which consists in mixing hydraulic cement and refractory aggregate and a small amount of heat bonding material taken from a group consisting of glass cullet, feldspar and frit with water, forming a concrete article from said mixture, curing the concrete article and firing the article under such conditions that the heat bonding material is reduced to a fused state forming a bond throughout the article.

2. The method of bonding concrete articles which consists in mixing hydraulic cement and refractory aggregate and a small amount of heat bonding material taken from a group consisting of glass cullet, feldspar and frit with water, forming a concrete article from said mixture, curing the concrete article and firing the article under such conditions that the heat bonding material is reduced to a fused state forming a bond throughout the article, and emerging upon the surface of the article forming a vitreous enamel coating thereon.

3. The method of bonding concrete articles which consists in mixing hydraulic cement and refractory aggregate and a small amount of glass cullet with water, forming a concrete article from said mixture, curing the concrete article and firing the article under such conditions that the glass cullet is reduced to a fused state forming a bond throughout the article.

4. The method of bonding concrete articles which consists in mixing hydraulic cement and refractory aggregate and a small amount of glass cullet with water, forming a concrete article from said mixture, curing the concrete article and firing the article under such conditions that the glass cullet is reduced to a fused state forming a bond throughout the article, and emerging upon the surface of the article forming a vitreous enamel coating thereon.

5. The method of bonding concrete articles which consists in mixing hydraulic cement and refractory aggregate and a small amount of heat bonding material taken from a group consisting of glass cullet, feldspar and frit with water, forming a concrete article from said mixture, curing the concrete article and firing the article under such conditions that the heat bonding material is reduced to a fused state forming a bond throughout the article, whereby a vitreous enamel coating may be applied to the surface of the article.

6. The method of bonding concrete articles which consists in mixing hydraulic cement and refractory aggregate and a small amount of glass cullet with water, forming a concrete article from said mixture, curing the concrete article and firing the article under such conditions that the glass cullet is reduced to a fused state forming a bond throughout the article, whereby a vitreous enamel coating may be applied to the surface of the article.

7. The method of bonding concrete articles which consists in mixing about one part of hydraulic cement and about three parts of refractory aggregate and about one-fourth of one part of heat bonding material taken from a group consisting of glass cullet, feldspar and frit with water, forming a concrete article from such mixture, curing the concrete article, and firing the article for about two minutes at about 2100° F. whereby the heat bonding material is reduced to a fused state forming a bond throughout the article and emerging upon the surface of the article forming a vitreous enamel coating thereon.

8. The method of bonding concrete articles which consists in mixing about one part of hydraulic cement and about three parts of refractory aggregate and about one-fourth of one part of heat bonding material taken from a group consisting of glass cullet, feldspar and frit with water, forming a concrete article from such mixture, curing the concrete article, applying a coat of vitreous enamel to the surface of the article and firing the article for about one-half a minute to two minutes.

9. The method of bonding concrete articles which consists in mixing about one part of hydraulic cement and about three parts of refractory aggregate and about one-fourth of one part of glass cullet with water, forming a concrete article from such mixture, curing the concrete article, and firing the article for about two minutes at about 2100° F. whereby the glass cullet is reduced to a fused state forming a bond throughout the article and emerging upon the surface of the article forming a vitreous enamel coating thereon.

10. The method of bonding concrete articles which consists in mixing about one part of hydraulic cement and about three parts of refractory aggregate and one-eighth to one-fourth of one part of heat bonding material taken from a group consisting of glass cullet, feldspar and frit with water, forming a concrete article from such mixture, curing the concrete article, applying a coat of vitreous enamel to the surface of the article and firing the article from one-half minute to two minutes at a temperature of about 2100° F.

11. The method of bonding concrete articles which consists in mixing about one part of hydraulic cement and about three parts of refractory aggregate and one-eighth to one-fourth of one part of glass cullet with water, forming a concrete article from such mixture, curing the concrete article, applying a coat of vitreous enamel to the surface of the article and firing the article from one-half minute to two minutes at a temperature of about 2100° F.

12. The method of bonding and glazing concrete articles which consists in forming a concrete article with a surface thereon formed of hydraulic cement, refractory aggregate and heat bonding material taken from a group consisting of glass cullet, feldspar and frit, curing the concrete article, applying a coat of vitreous enamel to said surface, and subjecting the enameled surface to sufficient temperature for a sufficient period of time to fuse the enamel while maintaining the body of the article below a temperature at which the mechanical and structural properties of the concrete would be damaged.

13. The method of bonding and glazing concrete articles which consists in forming a thin slab of hydraulic cement, refractory aggregate and heat bonding material taken from a group consisting of glass cullet, feldspar and frit, having anchoring means on one side thereof, curing said slab, applying a coat of vitreous enamel to the outer side of the slab, subjecting the slab to sufficient temperature for a sufficient period of time to fuse the enamel, and forming a body of hydraulic cement and aggregate upon said one side of the slab and anchored thereto.

14. The method of bonding and glazing concrete articles which consists in forming a slab of hydraulic cement, refractory aggregate and heat bonding material taken from a group consisting of glass cullet, feldspar and frit, having anchoring means on one side thereof, applying a coat of vitreous enamel to the outer side of the slab, and subjecting the slab to sufficient temperature for a sufficient period of time to fuse the enamel.

15. The method of bonding concrete articles which consists in mixing hydraulic cement and refractory aggregate and a small amount of heat bonding material taken from a group consisting of glass cullet, feldspar and frit with water, forming a concrete article from said mixture, curing the concrete article, applying a vitreous enamel coating to the surface of the article, and firing the article under such conditions that the heat bonding material is reduced to a fused state forming a bond throughout the article.

16. The method of bonding concrete articles which consists in mixing hydraulic cement and refractory aggregate and a small amount of glass cullet with water, forming a concrete article from said mixture, curing the concrete article, applying a vitreous enamel coating to the surface of the article, and firing the article under such conditions that the glass cullet is reduced to a fused state forming a bond throughout the article.

17. The method of forming a concrete article having a bonded surface portion capable of receiving a vitreous enamel coating, which consists in mixing hydraulic cement, refractory aggregate and a small amount of heat bonding material taken from a group consisting of glass cullet, feldspar and frit, with water, forming a thin layer of said mixture in a mold, filling the remainder of the mold with a mixture of hydraulic cement, aggregate and water, curing the concrete article thus formed and submitting only said thin layer thereof to sufficient temperature to reduce the heat bonding material therein to a fused state forming a bond throughout said thin layer.

18. The method of forming a concrete article having a bonded surface portion capable of receiving a vitreous enamel coating, which consists in mixing hydraulic cement, refractory aggregate and a small amount of heat bonding material taken from a group consisting of glass cullet, feldspar and frit, with water, forming a thin layer of said mixture in a mold, filling the remainder of the mold with a mixture of hydraulic cement, aggregate and water, curing the concrete article thus formed and submitting only said thin layer thereof to sufficient temperature to reduce the heat bonding material therein to a fused state forming a bond throughout said thin layer, said fused heat bonding material emerging upon the surface of said thin layer forming a vitreous enamel coating thereon.

19. The method of bonding and glazing concrete articles which consists in forming a thin slab of hydraulic cement, refractory aggregate and heat bonding material taken from a group consisting of glass cullet, feldspar and frit, attaching a body of hydraulic cement and aggregate upon one side of the slab, curing the slab, applying a coat of vitreous enamel to the opposite side of the slab, and firing the slab for about one-half minute to two minutes.

WILLIAM S. RAMSAY.

REFERENCES CITED

The following references are of record in the file of this patent:

UNITED STATES PATENTS

| Number | Name | Date |
|---|---|---|
| 836,369 | Dexter | Nov. 20, 1906 |
| 1,784,392 | Rowland | Dec. 9, 1930 |
| 1,790,227 | Cederquist | Jan. 27, 1931 |
| 2,044,204 | Brice et al. | June 16, 1936 |
| 2,133,245 | Brice et al. | Oct. 11, 1938 |